Figure 1:
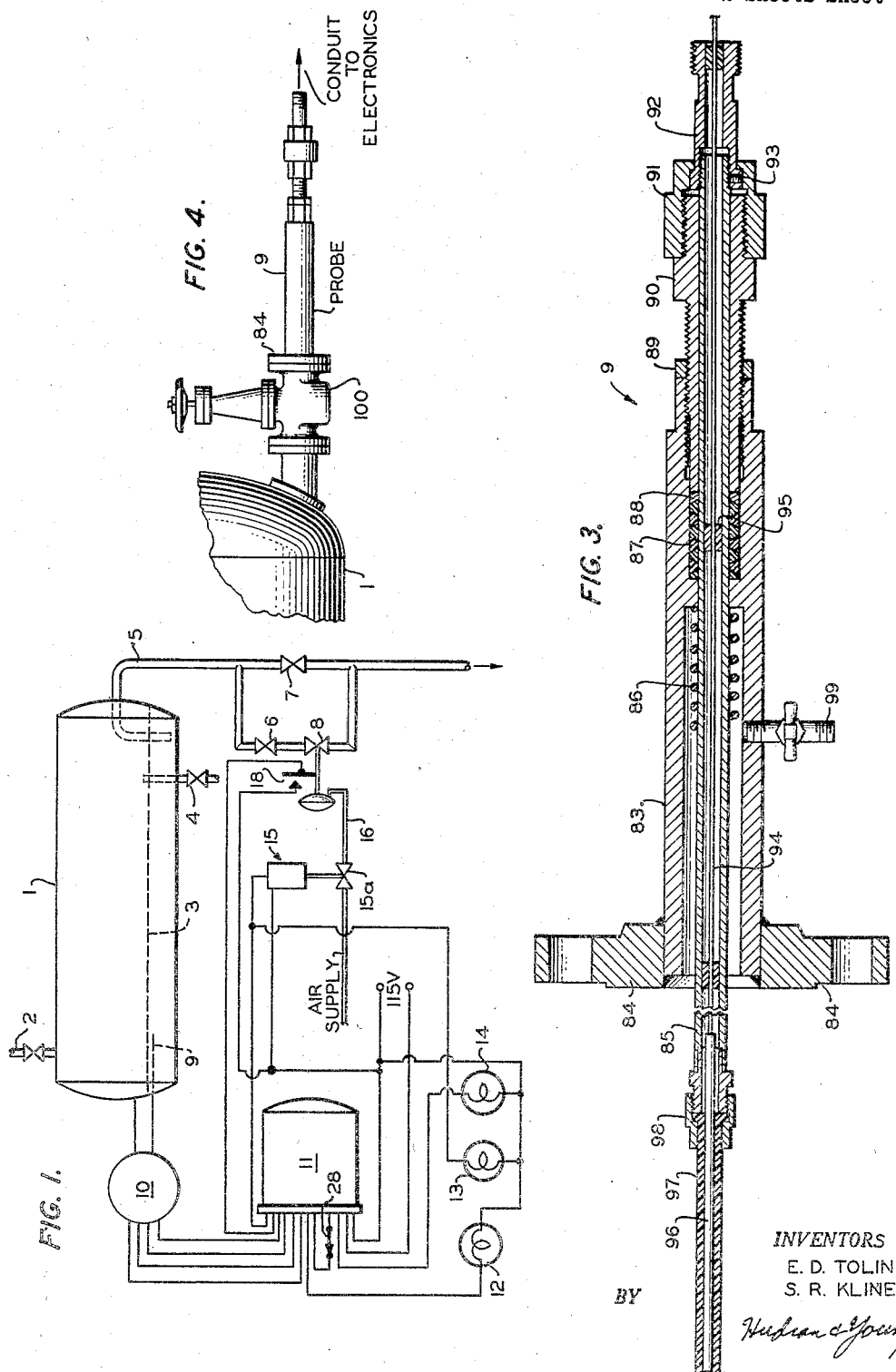

April 21, 1959 E. D. TOLIN ET AL 2,882,920
INTERFACE LEVEL CONTROL
Filed Dec. 30, 1954 2 Sheets-Sheet 1

INVENTORS
E. D. TOLIN
S. R. KLINE
BY Hudson & Young
ATTORNEYS

INVENTORS
E. D. TOLIN
S. R. KLINE
BY
Hudson & Young
ATTORNEYS

United States Patent Office 2,882,920
Patented Apr. 21, 1959

2,882,920

INTERFACE LEVEL CONTROL

Ernest D. Tolin, Bartlesville, Okla., and Sidney R. Kline, Carrizozo, N. Mex., assignors to Phillips Petroleum Company, a corporation of Delaware Application December 30, 1954, Serial No. 478,612

9 Claims. (Cl. 137—172)

This invention relates to apparatus for regulating the level of a liquid interface in a container. In one of its aspects it relates to an apparatus for draining moisture accumulation from the bottom of a hydrocarbon storage tank. In a more specific aspect this invention relates to an improvement in apparatus for removing condensed moisture accumulation from a hydrocarbon storage container.

The measurement of dielectric properties of material is well known in the art. The measurement of such dielectric properties can be utilized in liquid level measurements, interface between two dissimilar liquid determinations and the like.

In the processing of petroleum products moisture often accumulates and is collected in traps or tanks wherefrom it is necessary to blow the water out at intervals. For instance in pipeline transportation, moisture traps are used. In the processing of petroleum fractions, steam distillation is frequently utilized and the gas from the distillation columns are saturated with steam. These gases along with the moisture are condensed or liquefied and the liquid hydrocarbon and the water form two phases which are easily separated. Frequently, this moisture accumulation is drained automatically, the interface between the water and hydrocarbon being detected by means of detecting changes in dielectric properties. Frequently the water level can be controlled between a high and a low level by the use of two probes. However, in many cases, this is unsatisfactory since only a few inches in a tank accounts for many gallons of valuable storage space. For that reason, it is desirable to maintain the water at the lowest safe level, i.e. the level wherein only water will be removed when the drain line is opened. By the use of a single on-off probe, there is a tendency of the control mechanism to hunt or change from open to closed to open positions rather rapidly, sometimes changing before the valve can be completely opened or closed. It is desirable therefore, to have a single probe liquid interface level control which will provide for a reasonable amount of drain on each opening of the drain valve in petroleum storage containers where moisture is apt to accumulate.

An object of this invention is to provide an improvement in a single probe interface liquid level controller in a container.

Another object of this invention is to provide a single probe interface liquid level controller which is substantially free of "hunting" or rapid fluctuations.

Another object of this invention is to provide a liquid interface level controller which will fail safe so as not to drain hydrocarbon in case of instrument failure.

It is still another object of this invention to provide an improved form of apparatus for detecting and controlling interface liquid level by measuring the dielectric properties of the two phases in terms of the capacitance of condenser.

The circuit of the apparatus of this invention comprises, generally, a positive and negative power supply; a source of high frequency oscillation; a probe element, circuitwise in the form of a pair of spaced electrodes, positioned such that the material under measurement can be disposed therebetween. This probe element forms one arm of an RF voltage divider having said source of high frequency oscillation applied across opposite terminals thereof. The apparatus further includes a meter relay responsive to the capacitance of the probe; an interval timer so connected to said meter relay to periodically sample the signal from the measuring circuit of said probe; a second interval timer to limit the operation time of control element; and means to open and close the drain valve responsive to said signal. Lights and other warning devices can be used if desired.

Figure 2:
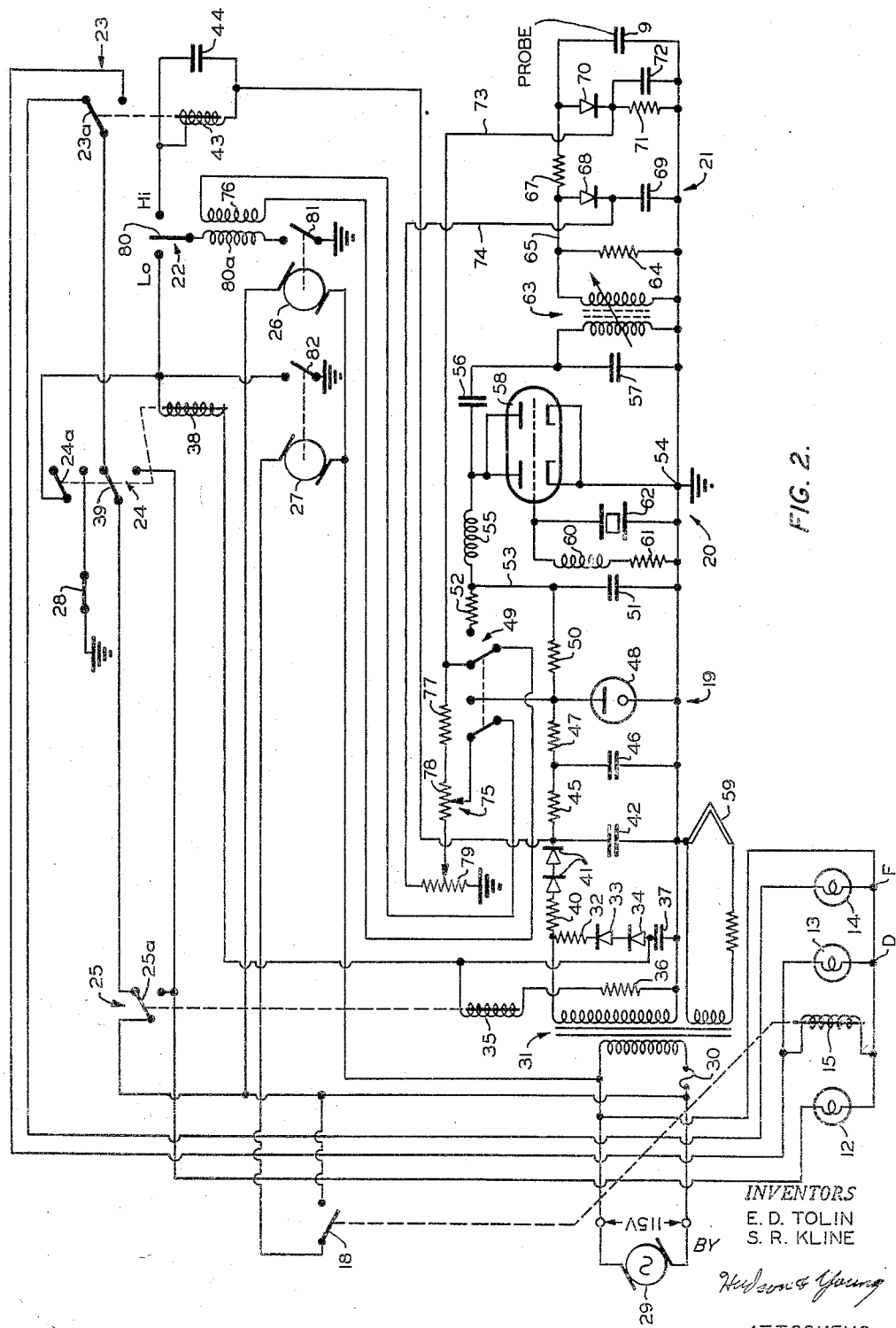

Other objects, advantages, and features of this invention will become apparent from the following detailed description taken in conjunction with the accompanying drawings of which:

Figure 1 is a schematic illustration showing how our apparatus can be used in conjunction with a storage tank, Figure 2 is a schematic circuit diagram for the apparatus of this invention, Figure 3 is a view, shown partially in section, of a probe element which is useful in detecting the interface change, and Figure 4 is a schematic showing of a typical installation of the probe of Figure 3.

In describing the drawings an installation is assumed wherein a hydrocarbon feed containing some moisture is passed through a surge or feed tank wherein the water and hydrocarbon separate into two phases. With the water drain valve on this feed tank open, the water will not completely drain in 5 minutes. The signal from the measuring circuit is sampled every minute. If other conditions prevail, it will be within the skill of the art to make the necessary changes in the values used in the following description.

Referring to Figure 1, the hydrocarbon-water mixture passes to tank 1 via conduit 2. The water and hydrocarbon separate into two phases forming an interface 3. The hydrocarbon draw-off conduit 4 has an inlet above the maximum level of this interface. A water draw-off tube 5 is closely spaced to the bottom of container 1. Valves 6 and 7 are provided to change from automatic to manual control when, for example, the automatic controls should fail, or complete draining is desired, etc. Ordinarily, valve 7 will be closed and valve 6 open. Valve 8 is an air operated control valve.

An interface sensing probe 9, more fully described in conjunction with Figure 3, is installed in tank 1 at the desired interface level. This probe 9 is electrically connected to a measuring circuit, more fully described in conjunction with Figure 2, in housing 10. The measuring circuit is electrically connected to high frequency supply, power supply, relays, etc. as will be more fully described which are housed in housing 11. These circuits in housing 11 are operably connected to red warning light 12, green drain light 13 and white fill light 14. Solenoid operated valve 15a is also operably connected to the circuits in housing 11 and is so arranged to admit air to conduit 16 response to changes in the interface level detected by probe 9. When air is admitted to conduit 16 it opens air operated control valve 8 which closes switch 18 completing the circuit through timing and control circuits in housing 11.

Figure 2 is a schematic wiring diagram of the circuits housed in housings 10 and 11 of Figure 1. Values given for various resistors, capacitors, rectifiers, etc., are for a given installation and can be varied for other conditions. Housed in housing 11 of Figure 1 is positive and negative power supply circuit 19, high frequency oscillator circuit 20, meter relay 22, drain-fill relay 23, failure relay 24, power failure relay 25, one minute interrupter timer 26, and 5 minute self-cocking timer 27. Housed in housing 10 of Figure 1 is measuring circuit 21. Reset button 28 is provided for resetting relay 24. Also shown are probe 9, warning light 12, drain light 13, fill light 14, solenoid 15 and switch 18 from Figure 1.

A 110–120 volt power source 29 is connected to the primary coil of transformer 31. A two ampere fuse 30 is used as a safety means in this main power source. Current for power supply 19 is taken off the secondary of transformer 31. Connected in parallel with the secondary of transformer 31 is a circuit including a 22 ohm resistor 32, rectifiers 33 and 34, and a 20 microfarad capacitor 37. Connected in series with the upper terminal of the transformer and ground are 22 ohm resistor 40, rectifiers 41, 2200 ohm resistor 45, 1500 ohm resistor 47, 1000 ohm resistor 50 and 0.05 microfarad capacitor 51. Connected intermediate rectifier 41 and resistor 45 to ground is 20 microfarad capacitor 42. Connected intermediate resistors 45 and 47 to ground is 40 microfarad capacitor 46. Connected intermediate resistors 47 and 50 and ground is gaseous voltage regulating tube 48. This circuit makes up the power supply. Power to relay coil 38 of relay 24 is taken off the power supply by a lead connected intermediate rectifier 34 and capacitor 37. Relay coil 35 of relay 25 is connected in series with 5600 ohm resistor 36 between a position intermediate rectifier 34 and capacitor 37 and ground. Positive power supply to relay coil 43 of relay 23 shunted by capacitor 44 is taken off the power supply at a position intermediate resistor 45 and the adjacent rectifier 41. Intermediate resistors 47 and 50 is a lead to one normal open terminal of double throw switch 49. Intermediate resistor 50 and capacitor 51 is one lead connection of 1 million ohm resistor 52 which is connected by its other lead to a second normal open terminal of the double throw switch 49.

The positive power supply terminal is connected to the anode of double triode vacuum tube 58 in oscillating circuit 20 via lead 53 and 10 millihenry inductor 55. The cathode of the tube 58 is connected to ground. The tube heater 59 derives its current from a secondary winding of transformer 31. The grids of the triode 58 are connected to ground 54 via 2.5 millihenry inductor 60 and 4700 ohm resistor 61 shunted by crystal 62. The output from oscillator circuit 20 is taken from the anode of double triode 58 through a coupling condenser 56 and applied to one terminal of the primary coil of slug tuned transformer 63, the other terminal being grounded. The primary coil of transformer 63 is shunted by a 500 micromicrofarad capacitor 57. The secondary of transformer 63 is shunted by a 220 ohm resistor 64.

The output of the secondary of tuned transformer 63 is connected to measuring circuit 21 which may be at a remote location via leads 65 and ground 54. Connected between lead 65 and ground lead 54 is 1000 ohm resistor 67 and probe 9. Also connected in series between these two leads are germanium crystal diode 68 and .011 microfarad capacitor 69. Also connected in series between ground 54 and a terminal intermediate resistor 67 and probe 9 are germanium crystal diode 70 and 10,000 ohm resistor 71. Shunting resistor 71 is .001 microfarad capacitor 72. Lead 73 is connected in the circuit intermediate germanium crystal diode 70 and resistor 71. Lead 74 is connected in the circuit intermediate germanium crystal diode 68 and capacitor 69. These two leads 73 and 74 connect this detector circuit to meter zero and sensitivity adjustments 79 and 75. It should be noted that probe 9 is a capacitor having a capacitance dependent upon the dielectric properties of the material separating the spaced elements of the probe. Ordinarily one side of the probe will be a wire or rod connected intermediate resistor 67 and germanium crystal diode 70 while the other side will be the grounded vessel wall.

Lead 73 connects a terminal intermediate diode 70 and resistor 71 through a normally closed terminal of double throw switch 49 to one side of inductor coil 76 of meter relay 22. This meter relay 22 is of the locking type and when the needle 80 contacts the "Hi" or "Lo" points it will remain in that position so long as any current flows. However, when the circuit is broken, the needle will float away from contact and will not reclose unless it is sufficiently activated. Lead 74 connects a terminal intermediate diode 68 and condenser 69 to one terminal of the 10,000 ohm variable zero potentiometer 79, the other terminal of said potentiometer being grounded. Lead 73 also connects intermediate diode 70 and resistor 71 via 270 ohm resistor 77 and 10,000 ohm resistor coil of potentiometer 78 to the contactor of variable resistor 79. The contactor of potentiometer 78 is connected to the remaining normal closed terminal of the double throw switch 49. This terminal is connected through the switch to the remaining terminal of the inductor coil 76 of the meter relay. The zero of needle 80 of meter relay 22 is adjusted by adjusting the variable resistor 79 and the sensitivity of the meter is adjusted by changing the resistance of potentiometer 78.

When the needle 80 of the meter relay 22 is intermediate the high and low contacts, relay switch 23a is in the up position and a circuit is completed from one side of the 115 volt supply 29 through switch 25a, 39, switch 23a, fill light 14 and the other side of the supply. Solenoid 15 is connected between one side of the power supply 29 through switch 23a, when in the down position, and the opposite side of the supply. Light 13 is connected in parallel with solenoid 15. The switch 18 is mechanically connected to air operated valve 8 so as to close when the solenoid 15 opens the air valve 15a of Figure 1. Warning light 12 is connected between the 115 v. supply through relay switch 39, when in the down position and switch 25a to the opposite side of 115 v. power supply ahead of fuse 30. Now if the fuse goes out the warning light will function.

A one minute interval timer 26 is operably connected to the 115 v. supply. This timer is mechanically connected to grounded switch 81 in series with needle 80 and locking coil 80a so as to break the circuit every minute for a short period of time, say one second. Since this meter relay 22 is self locking, needle 80 can only break from the contacts "Lo" or "Hi" by breaking the circuit at switch 81. Upon closing switch 81, if the signal is such as to remake the "Hi" contact, the relay coil 43 will maintain switch 23a closed down position, otherwise it will open to up position. The relay 43 is so constructed that the capacitor 44 will keep switch 23a closed in the down position during the period of interruption, but if 80 fails to remake contact on closing 81, the switch 23a will move to the up position and 80 will move from contact with "Hi" position. Each time switch 23a is pulled to the down position (drain position), 5 minute timer 27 is started as a result of drain valve 8 closing microswitch 18. When switch 23a returns to the up position, the 5 minute timer returns to the original position resetting itself. This 5 minute timer is mechanically connected to switch 82 which upon closing will complete the circuit through coil 38 which pull relay switches 24a and 39 to the down position, causing warning light 12 to light up.

We have described a typical circuit for a given installation wherein water is being drained from a hydrocarbon storage tank. Those skilled in the art will see many changes which can be made particularly after reading the description of the operation of this apparatus which will be explained after describing a suitable probe as shown in Figure 3.

Referring to Figure 3, a suitable dielectric probe is shown. This probe is fully described and claimed in copending application of Dale E. Lupfer having Serial No. 474,730 filed December 13, 1954, now Patent No. 2,815,663 issued Dec. 10, 1957. The probe 9 is comprised of body 83 which is welded to tank flange 84 for mounting. A slip tube 85 is screw fitted into body 83, packing rings 87 and packing follower 88 by lock nut 89, spacing nut 90, union 91 and 92 and set screws 93. A conductor 94 runs through the slip tube to electrode 96. This conductor is held in place by bead insulator 95. The electrode 96 is covered by a coating material 97 of a given dielectric. This electrode is sealed in place by means of packing nut 98. A valve 99 is provided to drain the body 83 when the slip tube is removed.

Figure 4 shows how probe 9 is mounted via flange 84 through valve 100 to tank 1.

The operation of our apparatus will be described with reference to Figures 1 and 2. The probe 9 is located in tank 1 at a level sufficiently high that it requires more than 5 minutes to drain the tank free of water when the interface between water and hydrocarbon being stored is at the level of the probe. At the beginning of the cycle, valve 7 is closed, 6 is open and valve 8 is closed. The interface level 3 is below the probe 9 and is rising. Water has a dielectric constant of about 80 and hydrocarbons have a dielectric constant of between 2 and 3. Since the probe is in the hydrocarbon, the signal received at the meter relay is not sufficient to cause the needle to contact the high position. The one minute timer opens and closes the switch 81 every minute. The circuit through coil 43 is not complete so relay switch 23a is in the up position completing the circuit to white fill light 14. When the interface rises high enough for the probe to contact water, the capacitance of the probe is greatly increased and the voltage drop from leads 73 to 74 also increases so that needle 80 moves and contacts the high contact position. When this happens, the circuit through coil 43 is completed and switch 23a is pulled to the down position breaking the circuit through light 14 and completing the circuit to solenoid 15 and light 13. Solenoid 15 opens the the air supply to air valve 15a which opens valve 8 closing switch 18 which in turn completes the circuit to 5 minute timer 27. When needle 80 contacts high contact position the timer 26 will break the circuit momentarily shortly after contact and once each minute thereafter at switch 81. By the momentary circuit breaking, the needle 80 is allowed to break away from the contact point "Hi." During this time, the capacitor 44 has enough stored energy to keep coil 43 activated holding switch 23 down. Upon closing the circuit at 81, the needle 80 will again reflect condition in the tank and will again contact "Hi" if the signal is sufficiently strong and switch 23a will remain down. Now after say three interruptions of the current, the water has drained sufficiently that the signal received by the relay 22 is small, the needle will fail to contact the "Hi" position and after the charge on capacitor 44 is expended, usually 2 or 3 seconds, coil 43 will no longer hold switch 23a down and it will return to its original up position, solenoid 15 will shut off the air, valve 8 will close, light 13 will be extinguished, the circuit to timer 27 will be broken and it will reset itself, fill light 14 will come on, and the tank 1 will begin to fill with water and hydrocarbon.

In a second case we will assume that due to some failure such as an over slug of water in the tank, a false signal, or for some other reason, the needle 80 remains in the "Hi" position for more than 5 minutes. In this case, 5 minute timer 27 will close switch 82 completing the circuit through coil 38 causing switches 24a and 39 to move to the lower positions. When this happens, the circuit through coil 38 is completed through switches 24a and 28 and so the coil will remain activated even though timer 5 returns to its cock position. When switch 39 changes position, it breaks the circuit to switch 23a and cuts off current to solenoid 15 which shuts off air to drain valve 8 allowing it to close, both the white and green lights will be extinguished, 5 minute timer 27 returns to its cock position, and red warning light 12 will come on. After the trouble is located and corrected, for example, by draining excess water from tank 1 via means of manual valve 7, the needle 80 will break contact from the high position. The operator can then break the circuit through 38 by opening reset switch 28 momentarily. The system is again ready to function.

In a third case we will assume a failure of signal to meter relay 22 due to a broken probe, power supply failure, failure of oscillator, etc. In such case the needle 80 will contact "Lo" contact point and complete circuit through coil 38. Again switches 24a and 39 will change positions and the procedure will be the same as described for case 2.

In a fourth case, we will assume that due to an overload, short circuit, etc., fuse 30 burns out. In this case current is still supplied momentarily to the fill light since there would be no current to hold the switch 23a down. Needle 80 will make contact with the low contact but since the fuse is out there will be no current to activate coils 38 and the indicator light would show that the level was below the probe level and the interface was rising but below the probe and this would be true even if the interface is well above the probe level. For this reason relay coil 35 and relay switch 25a is provided. As long as there is voltage supplied to the system, the relay 35 will maintain switch 25a in the up or normal position. When power fails, the switch 25a will drop breaking the circuit to relay 23 and completing the red warning light circuit. The one minute timer 26 is also on the main line.

The switch 49 is provided to connect the D.C. plate current of the high frequency oscillator 20 to signal coil 76 of meter relay 22. When the switch is thrown to complete the circuit to the meter relay 22 from the lead connected intermediate resistors 47 and 50 and back to the high resistor 52 the needle will not contact the low contact and the meter relay will be disconnected from the measuring circuit 21. With no current being drawn from the measuring circuit, the oscillator can be tuned by adjusting tuned transformer 63.

Our invention has been described in one of its embodiments. It will be obvious to those skilled in the art that many changes can be made without departing from the scope of this invention. For systems other than water and hydrocarbon, other values may be more suitable for the various resistance, capacitors, rectifiers, etc. The red warning light can be made to blink instead of remaining on constantly. On the other hand, the red warning light can be made to remain on except when trouble develops. Many such changes as desired can be made.

We claim:

1. An interface level controller adapted to control the level of liquid interface between two liquid phases in a container wherein said liquids have different capacitances, said controller comprising in combination a dielectric probe located in said container at the desired interface level; a self locking meter relay having an indicating needle and a contact engageable thereby; means for deflecting the indicating needle of said meter relay to said contact thereof when the capacitance detected by said probe exceeds a predetermined level; means for passing a current through the relay coil of said meter relay and through said needle when said needle contacts said contact thereby locking said needle in position; a relay switch responsive to said relay coil; a capacitor shunting said relay coil; a valve adapted to drain liquid from said container when open; means for opening said drain valve when said relay switch is activated by said relay coil and means for closing said valve when said coil is deactivated; an interval timer adapted to break the circuit through said relay coil and needle periodically for an interval less than the discharge time of said capacitor thereby periodically allowing the needle to pull away from said high contact.

2. An interface level controller adapted to control the level of the liquid interface between two liquid phases in a container wherein said liquids have different capacitances, said controller comprising in combination a dielectric probe located in said container at the desired interface level to detect capacitance changes; a valve for draining liquid from said container; a meter relay responsive to capacitance changes detected by said probe; a relay comprising a relay coil and a relay switch responsive to current flowing through said relay coil; a capacitor shunting said relay coil; an indicating needle in said meter relay, a contact point contacted by said needle when the capacitance of the probe exceeds a predetermined value connected by an electrical lead to one terminal of said relay coil; means for passing a current through said relay coil when said needle contacts said contact thereby holding said needle on said contact and activating said relay switch; means for opening said drain valve responsive to said switch being activated; means for periodically interrupting the flow of current through said relay coil and said needle for an interval less than the discharge interval of said capacitor and thereby allowing said needle to break from said contact and a self locking means for interrupting current to said relay switch should said relay switch remain activated for a predetermined period longer than first said interval of current interrupter, said self locking means being reactivated each time said relay switch is activated.

3. An interface level controller adapted to control the level of a liquid interface between two liquid phases of different capacitance in a vessel, said controller comprising in combination a dielectric probe located in said vessel at the desired interface level; means for supplying a potential to said probe; a meter coil; means for passing a current to said meter coil proportional to current flowing across said probe; a needle adapted to being deflected in response to current flowing through said meter coil; first and second contact points so arranged that said needle contacts said first contact point when the flow of current to said meter coil reaches a predetermined minimum and contacts said second contact point when the last-mentioned current reaches a predetermined maximum; a relay coil having one terminal connected to said second contact and the other terminal connected to a positive power source; a capacitor shunting said relay coil; a second relay coil having one terminal connected to said first contact and the other terminal connected to a negative power source; means for completing a circuit through the connected coil and needle when said needle contacts the connected contact point; means for locking said needle in position when current flows through said needle; means for periodically interrupting the flow of current through said needle for intervals less than the discharge interval of said capacitor; a double throw relay switch activated by the first said relay coil; a fill light; means for passing current to said fill light through said relay switch when said first relay coil is not activated; a drain valve in said vessel; a drain light; means for opening said drain valve responsive to electrical current; means for passing current to said drain light and to said means for opening said valve when said relay switch is activated by current in the first said relay coil; means for closing said valve when current ceases to flow to the valve opening means; and a second relay switch responsive to second said relay coil; a warning light; means for interrupting current to the first said relay switch and for sending current to said warning light when the second said relay coil is activated by current flow; a self locking timing device having a time cycle longer than the first said current interrupting means; means for starting said timing device each time the first said relay switch is activated by current flow through the first said relay coil; means for resetting the last said timing device each time the first said relay switch is deactivated; and means for completing the negative power circuit through the second said relay coil when said timing device continues for a predetermined time longer than the first said interrupting means.

4. An interface level controller comprising in combination an alternating current source; a positive and negative power supply; electrical leads connecting the current source to the input of said power supply; a high frequency oscillator; electrical leads conecting the output of the power supply to the input of said high frequency oscillator; a measuring circuit; electrical leads connecting the output of said oscillator to the input of said measuring circuit; a single dielectric probe adapted to be placed in a container; electrical leads connecting said probe to said measuring circuit so as to form one arm of a bridge circuit in said measuring circuit, the high frequency oscillator being connected to opposite terminals of said bridge circuit; a self locking meter relay comprising a meter coil, a contact needle and a relay coil; electrical leads connecting the output of said measuring circuit through suitable adjusting means to the meter coil of said meter relay; a relay switch adapted to operate off of said relay coil; a solenoid; electrical leads connecting said solenoid to said relay switch, said solenoid being connected to a drain valve so that said drain valve will open when the capacitance of said probe is high and will close when said capacitance is low; an electrical driven interval timer having its input connected to said electrical source; an electrical lead connecting a positive output from said power supply to one side of said relay coil, the circuit of said relay coil being completed through said needle of said meter relay when said needle is deflected by high capacitance; and means connecting said interval timer to said needle so as to interrupt the current flow through said relay coil and said needle at regular intervals.

5. An interface liquid level controller for regulating the interface between two liquid phases having different capacitance and contained in a vessel, said regulator comprising in combination a power source; a positive and negative power supply; leads connecting said source to the input of said power supply; a relay activated by current to said power supply; a high frequency oscillator; leads connecting output of said power supply to the input of said high frequency oscillator; a tuned transformer; leads connecting the output of said oscillator to the input of said transformer; a bridged measuring circuit; leads connecting the output of said tuned transformer to the input of said measuring circuit; a dielectric probe located at the desired level of said interface in said vessel; leads connecting said probe to opposite terminals of said bridged measuring circuit; a variable resistance voltage regulator; leads connecting the output of said measuring circuit to said voltage regulator; a meter coil; leads connecting take off from said voltage regulator across said meter coil; a needle responsive to current flow through said meter coil; a low contact point so located that said needle will contact said point when current flow through said meter coil falls below a predetermined minimum; a high contact point so located that said needle will contact same when current flow through said meter coil exceeds a predetermined maximum; an interrupter switch connecting the opposite end of said needle to ground; a second relay coil; a lead connecting the positive power output from said power supply to one terminal of said second relay coil; a lead connecting said high contact point to the opposite terminal of said second relay coil; a capacitor shunting said second relay coil; a third relay coil; a lead connecting the negative power output of said power supply to one terminal of said third relay coil; a lead connecting the opposite terminal of said third relay coil to said low contact point; a relay switch responsive to the first said relay coil; a relay switch responsive to the second said relay coil, a relay switch responsive to said third relay coil; a lead connecting one terminal of the power source to said first relay switch; a lead connecting a terminal of said first relay switch through said first relay coil to said second relay switch; a lead connecting the second relay switch terminal which is closed with power off to the third relay switch; a drain light; a lead connecting said third relay switch with power off to said drain light; a lead connecting the opposite terminal to said power source completing circuits; a drain light; a solenoid valve; a lead connecting power on a terminal of third relay switch to the drain light and to the solenoid; a lead connecting opposite sides of the solenoid and drain light to the power source completing circuit; a drain valve in said vessel operably connected to said solenoid as to open when the solenoid is activated and to close when solenoid is deactivated; motor means to open the interrupter switch on said needle at regular intervals for a period of time less than time required for said shunting capacitor to discharge; a self locking electrical driven means connected to a normally open switch, the time required to close said switch being longer than the interval of the said interrupter switch; a lead connecting the power supply to one terminal of said electrical driven means; a lead connecting the opposite terminal of said electrical driven means to power on a terminal of said third relay switch; a lead connecting one terminal said of normally open switch; a lead connecting the opposite terminal of said normally open switch to the terminal of third said relay coil which is connected to said low contact; a warning light; a lead connecting the power off the terminal of the first said relay switch and power off the terminal of the second said relay switch to the warning light and a lead connecting the warning light to said power source.

6. An interface level controller comprising, in combination, a dielectric probe adapted to be placed in the wall of a container, a relay having a contact, a needle engageable therewith and an inductor coil, means connecting said coil in circuit with said probe so as to close said contact when the probe capacitance reaches a predetermined value, means to maintain said needle in engagement with said contact after closure thereof, a timer connected to said means to maintain said needle in engagement with said contact after closure thereof periodically interrupting the operation thereof and permitting opening of said contact, a valve controlling the flow of fluid from said container, actuating means, connected to said valve and means connecting said actuating means to said contact so that the valve is operated in response to opening and closing of said contact.

7. An interface level controller comprising, in combination, a dielectric probe adapted to be placed in the wall of a container, a relay having a contact, a needle engageable therewith and an inductor coil, means connecting said coil in circuit with said prove so as to close said contact when the probe capacitance reaches a predetermined value, means to maintain said needle in engagement with said contact after closure thereof, a timer connected to said means to maintain said needle in engagement with said contact after closure thereof periodically interrupting the operation thereof and permitting opening of said contact, a valve arranged to drain fluid from said container, actuating means connected to said valve, means connecting said actuating means to said contact so that the valve is operated in response to opening and closing of said contact, and means connected in circuit with said valve actuating means to prevent operation thereof during the period when the relay contact is opened due to the operation of said timer.

8. An interface level controller adapted to control the level of liquid interface between two liquid phases in a container wherein said liquids have different capacitances, said controller comprising in combination a dielectric probe located in said container at the desired interface level; a first relay having an inductor coil, a needle, and a contact, a first circuit connecting said probe to said coil to energize the relay when the capacitance of said probe exceeds a predetermined value, a second circuit connected to said coil to maintain said relay in energized position after actuation thereof, a second relay having a coil and a contact, leads connecting the coil of said second relay in circuit with said contact of said first relay, means connected to said second relay to delay the opening thereof for a predetermined interval after de-energization of its coil, a valve adapted to drain liquid from said container when open, actuating means for said valve, a third circuit connecting said actuating means to said contact of said second relay whereby said valve is open when the second relay is energized and closed when said second relay is de-energized, and a timer connected in said second circuit connected to said coil to maintain said relay in energized position after actuation thereof and arranged to periodically break said circuit connected to said coil to maintain said relay in energized position after actuation thereof for a period less than the predetermined interval provided by said means connected to said second relay to delay the opening thereof for a predetermined interval after de-energization of its coil.

9. An interface level controller comprising, in combination, a dielectric probe adapted to be placed in the wall of a container, a relay having a contact, a needle engageable therewith and an inductor coil, means connecting said coil in circuit with said probe so as to close said contact when the probe capacitance reaches a predetermined value, means arranged to maintain said needle in engagement with said contact after closure thereof, a timer connected to said means arranged to maintain said needle in engagement with said contact after closure thereof periodically interrupting the operation thereof and permitting opening of said contact, a valve arranged to drain fluid from said container, actuating means connected to said valve, means connecting said actuating means to said contact so that the valve is operated in response to opening and closing of said contact, means connected in circuit with said valve actuating means to prevent operation thereof during the period when the relay contact is opened due to the operation of said timer, a second timer having a period several times as long as that of said timer connected to said means arranged to maintain said needle in engagement with said contact after closure thereof, said last-mentioned timer being reset by each actuation of said valve, and means actuated at the end of the delay period of said last-mentioned timer to disable said relay and thus prevent further opening of said valve.

References Cited in the file of this patent
UNITED STATES PATENTS

| | | |
|---|---|---|
| 2,204,532 | Erbguth et al. | June 11, 1940 |
| 2,573,172 | Ennis et al. | Oct. 30, 1951 |
| 2,626,385 | Schumann | Jan. 20, 1953 |